(12) United States Patent
Swindell

(10) Patent No.: US 9,566,833 B2
(45) Date of Patent: Feb. 14, 2017

(54) TIRE PRESSURE CONTROL SYSTEM

(71) Applicant: Jeffrey L. Swindell, Bartlett, TN (US)

(72) Inventor: Jeffrey L. Swindell, Bartlett, TN (US)

( * ) Notice: Subject to any disclaimer, the term of this patent is extended or adjusted under 35 U.S.C. 154(b) by 0 days.

(21) Appl. No.: 14/697,802

(22) Filed: Apr. 28, 2015

(65) Prior Publication Data

US 2015/0314655 A1 Nov. 5, 2015

Related U.S. Application Data

(60) Provisional application No. 61/986,128, filed on Apr. 30, 2014.

(51) Int. Cl.
*B60C 23/00* (2006.01)
*B60C 23/16* (2006.01)

(52) U.S. Cl.
CPC ........... *B60C 23/004* (2013.01); *B60C 23/001* (2013.01); *B60C 23/16* (2013.01)

(58) Field of Classification Search
CPC ...... B60C 23/00; B60C 23/004; B60C 23/001; B60C 23/16; B60C 23/0491; B60C 23/0496

See application file for complete search history.

(56) References Cited

U.S. PATENT DOCUMENTS

| | | | |
|---|---|---|---|
| 3,361,180 A * | 1/1968 | Neilson | B60C 23/004 152/415 |
| 3,537,663 A | 11/1970 | Johnson | |
| 3,961,309 A | 6/1976 | Eddy | |
| 4,742,854 A | 5/1988 | Forslund | |
| 4,763,709 A * | 8/1988 | Scholer | B60C 23/001 141/38 |
| 5,257,642 A | 11/1993 | Worth | |
| 5,587,698 A * | 12/1996 | Genna | B60C 23/0493 116/34 R |
| 5,832,951 A | 11/1998 | Conroy, Sr. | |
| 5,928,444 A * | 7/1999 | Loewe | B60C 23/004 152/418 |
| 5,954,084 A | 9/1999 | Conroy, Sr. | |
| 6,161,565 A * | 12/2000 | Conroy, Sr. | B60C 23/004 137/224 |
| 6,894,607 B1 * | 5/2005 | Claussen | B60C 23/003 137/225 |
| 7,690,411 B2 | 4/2010 | Wilson | |
| 2014/0012466 A1 * | 1/2014 | Tanno | B60C 23/004 701/36 |
| 2014/0090463 A1 * | 4/2014 | Nagora | B60C 23/0491 73/146.5 |

* cited by examiner

*Primary Examiner* — Frank Vanaman
(74) *Attorney, Agent, or Firm* — Richard C. Litman

(57) ABSTRACT

A tire pressure control system includes a tire mounted on a wheel that is connected to an axle, with pneumatic fittings communicating with an interior of this tire. A digital pressure switch has a pair of pneumatic lines that extend from it. These pneumatic lines connect to the pneumatic fittings so that the digital pressure switch communicates with the tire. An electronic solenoid valve communicates with the digital pressure switch by electrical connection to communicate with the interior of the tire. The electronic solenoid valve operates in a corresponding relationship to the interior of the tire so gas above a set pressure can pass to atmosphere. A battery assembly powers and activates the digital pressure switch, and further powers the electronic solenoid valve through the digital pressure switch. A housing houses the digital pressure switch, the electronic solenoid valve, and the battery assembly.

8 Claims, 2 Drawing Sheets

TIRE PRESSURE CONTROL SYSTEM

CROSS-REFERENCE TO RELATED APPLICATION

This application claims the benefit of U.S. Provisional Patent Application Ser. No. 61/986,128, filed on Apr. 30, 2014.

BACKGROUND OF THE INVENTION

1. Field of the Invention

The present invention relates to pressure sensing, and particularly to a tire pressure control system.

2. Description of the Related Art

Air pressure buildup in the tires of vehicles, such as motorsports vehicles, has been a problem. Tires, such as tires used for motorsports vehicles, will perform noticeably and dramatically different as the air pressure changes. For example, pressure changes of as little as tenths of a pound per square inch (PSI) can cause the performance of tires to change.

In certain situations, air pressure changes can also be utilized. For example, a different air pressure can be utilized for changing surface conditions to enhance the grip of the tire to the surface. Another example can be in changing the set-up of the vehicle, in which a certain tire on the vehicle can grip more or less than the other tires in order to make the vehicle turn more or less, depending on surface conditions. This can result in different optimum pressure from tire to tire.

Various approaches commonly used today attempt to address and combat problems with air pressure. One approach is to start an event with less pressure in the tire than is best suited for the tires optimum performance pressure. This is done in order to guess at how much pressure the tire will gain to attain its optimum performance pressure once it reaches its highest temperature under race conditions. This approach can be problematic, due to the poor performance at the start of an event with the lower air pressure, and that it is merely a guess as to how much pressure gain will occur.

Another approach is to use compressed nitrogen, since nitrogen will not gain as much pressure under heat changes as regular compressed air. However, with this approach, a user must purge the air out of the tire by filling the tire with nitrogen, and also by using a suction or vacuum device to evacuate all of the air they can. Then, you need to refill the tire with compressed nitrogen, and you have to repeat this step several times to evacuate as much of the compressed air as possible. Under this approach you can never remove all of the compressed air, and then the nitrogen still has some pressure gain when the tire increases the temperature under race conditions, once again guessing to attain the proper pressure setting.

Another way, which can be considered the most common in motorsports today, is the use of a manual pop off bleeder valve. These manual pop-off bleeder valves on the market today generally consist of a unit, that has a body, and that contains a diaphragm seat. The diaphragm seat is preset with the pressure of a spring, which is adjusted by the height of the spring retainer, which puts more or less pressure on the seats as to bleed off the air at a preset pressure. The diaphragm seat is then connected to the wheel via a quick connect hub that access the tire's pressure.

While these approaches may help, there are still many problems with them. One of the possible problems involves the diaphragms, which can be very small. Further, the bleed off in many instances is slower than the pressure buildup. For example, you may want the bleeder to maintain 8 psi, and sometimes it may not start bleeding aggressively until closer to 9 psi. So it takes a longer period of time to bleed down to the preferred 8 psi because as the pressure gets closer to the preferred 8 psi, the bleed off becomes slower due to less pressure against the spring so the diaphragm isn't opened as much.

To compensate for this problem, you then set the bleeder pop off to a lower than desired pressure to help keep up with the pressure buildup. However, this also has its problems as to the fact that you must start the event with less than desired pressure as to maintain the preferred operating pressure during race conditions. But then during the event there may be a caution period in order to assist in a wreck of another vehicle. At idle speed the bleeder will bleed the tire pressure off back to the lower pressure, thus making the tire not perform at the optimum performance once the race resumes.

Many times these bleeders have a tendency to stick open when debris gets in the diaphragm. Or, the diaphragms gets overused, sometimes resulting in a flat tire which then has to be changed to a new tire, thus taking you out of the competition. It is not unusual to spend thirty minutes or more working on each of these bleeders each time you reset them to a different pressure or simply to maintain the current pressure setting for they are not very repetitive.

Bleeder valves have been utilized in motorsports vehicle pneumatic tires for years as a way to bleed off excess tire pressure buildup due to heat gain under race conditions. One such example of this device was awarded to Worth, in U.S. Pat. No. 5,257,642. In this patent, a mechanical device is mounted into the wheel of the tire/wheel assembly, with a spring-actuated diaphragm that is preset to an upper limit, to release excess tire pressure buildup due to heat gain inside the tire. This unit takes several minutes to change the setting and still isn't very accurate to precise settings, and doesn't repeat consistently.

Another example of these types of devices was awarded to Conroy Sr. in U.S. Pat. No. 5,954,084. This device is also a spring-actuated diaphragm that is located in the central axis of the axle of the wheel/tire assembly, so as to alleviate the rotating centrifugal force on the mechanical device, like the above mentioned device by Worth. Although this device does tend to operate better because it utilizes a larger diaphragm, it is still a mechanical device that has the same problems with precision, repeatability and consumption of time when presetting the device.

Another device is a pressure control system that was awarded to Wilson in U.S. Pat. No. 7,690,411. This device is mounted to the wheel and utilizes a servo mechanically connected to a valve that can release or add pressure to a tire, which is in direct control of the driver of the vehicle, which also utilizes a pressurized tank that is mounted in the axle of the wheel/tire assembly for adding air pressure when needed. The problems with such a device are that it is mounted directly to the wheel. Further, the use of a mechanically operated valve can need extra maintenance, and that it must be mounted to each individual wheel and by not mounting the device in the center of the rotating axis of the wheel/tire assembly. Additionally, the assembly will have to be balanced to accommodate the device, thus adding unwanted rotating weight to the wheel/tire assembly, which is a drain on the vehicles engine power.

Therefore, it is desirable for a method and apparatus that allows for digital pressure regulating that is easy to setup, install and/or change the pressure amount by hundredths of a pound (psi) quickly in vehicles, such as motorsports vehicles, and the like. It is further desirable for all these various features to be implemented within a single apparatus for easy use and maintenance, so that it can easily be quickly removed when changing the tire/wheel or for maintenance when need be. Additionally, it is also desirable for the apparatus to be capable of moving from one wheel to another, or to be removed from the wheel, in a hurried situation.

Thus, a tire pressure control system addressing the aforementioned problems is desired.

SUMMARY OF THE INVENTION

The tire pressure control system includes a tire mounted on a wheel, where the wheel is connected to an axle. Further, pneumatic fittings communicate with an interior of this tire. A digital pressure switch has a pair of pneumatic lines that extend from it. These pneumatic lines connect to the pneumatic fittings so that the digital pressure switch can communicate with the tire. An electronic solenoid valve communicates with the digital pressure switch by electrical connection so that the electronic solenoid valve can also communicate with the interior of the tire. The electronic solenoid valve operates in a corresponding relationship to the interior of the tire so gas above a set pressure can pass to atmosphere. A battery assembly powers the digital pressure switch, and further powers the electronic solenoid valve through the digital pressure switch. This battery assembly distributes electrical charges to activate the digital pressure switch so that the electronic solenoid valve operates. A housing that can be put within the axle and removed from the axle houses the digital pressure switch, the electronic solenoid valve, and the battery assembly.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The tire pressure control system provides a method and apparatus for accurately regulating air pressure in a pneumatic tire/wheel assembly. The system includes an adjustable digital pressure switch that is in fluid connection to the wheel by means of a quick disconnect pneumatic fitting via pneumatic tubing of a tire. This adjustable digital pressure switch activates an electronic solenoid valve that is in fluid connection to the wheel by means of a separate quick disconnect pneumatic fitting via a separate pneumatic tube located in a separate location from the first pneumatic tube. When electronically activated, the electronic solenoid valve bleeds off excess air pressure due to heat gain to maintain an optimum preset air pressure amount mainly for, but not limited to, motorsports or high performance vehicles.

The tire pressure control system provides a more accurate and repeatable pressure regulating apparatus, that is accurate to hundredths of a pound (psi) and that does not let the pressure in the tire increase more than is wanted so as to maintain optimum tire performance. The tire pressure control system also does not let the pressure in the tire decrease more than is wanted so as to maintain optimum tire performance.

Figure 1:
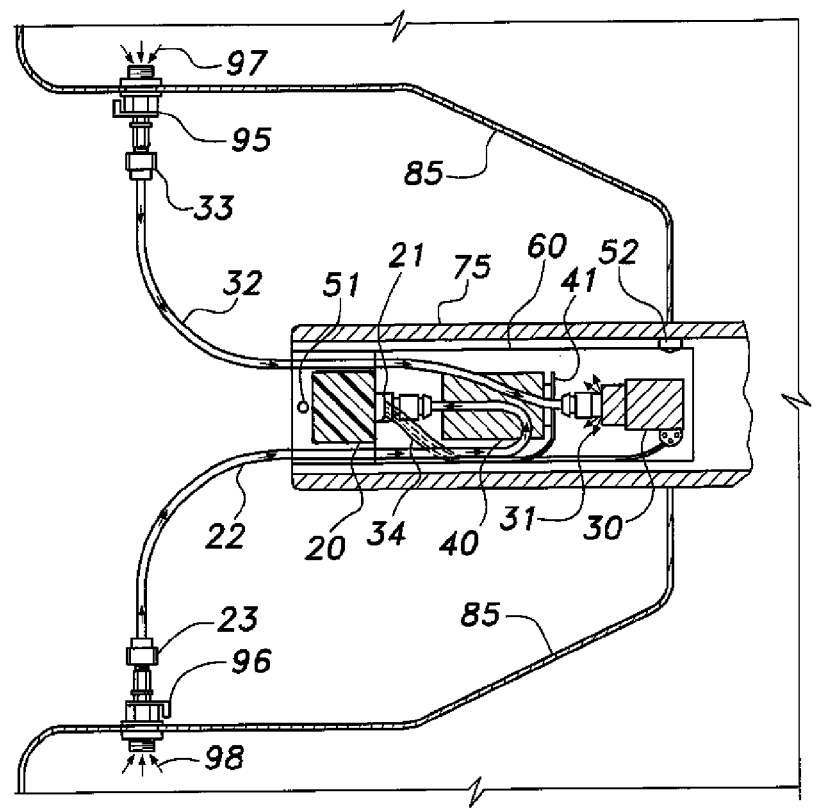
FIG. 1 is an environmental cutaway view of a tire pressure control system according to the present invention.

Referring to FIGS. 1-5, a tire pressure control apparatus 50 is shown. The tire pressure control apparatus 50 can be positioned within an axle 75, as shown in FIG. 1. Further, a wheel assembly 85 is positioned in conjunction with the axle 75. The wheel assembly 85 can be mounted on the axle 75, such as rotatably mounted onto the axle 75. Further, the wheel assembly 85 includes a tire. The tire pressure control apparatus 50 can be mounted in a center most axis of the rotating tire/wheel so as to maintain the balance of such tire/wheel and to have the weight of the apparatus at the center of rotation of the tire/wheel. This allows the apparatus to keep rotating as easy as possible and also to use less horsepower to rotate. This can be accomplished by a body that is smaller than the open interior of a hollow axle, such as axle 75, that the wheel/tire is attached to or by an attached mounting apparatus to the end of the axle 75 or a solid hub when a hollow axle is not available.

The tire pressure control apparatus 50 includes a digital pressure switch 20, which is connected to the wheel assembly 85 via a pneumatic line 22. The digital pressure switch 20 can also be a gauge, such as an air pressure gauge. Continuing with FIG. 1, two independent pneumatic tubing/lines 22, 32 allow connections between the tire pressure control apparatus 50 and the tire/wheel assembly 85. One of these pneumatic lines can extend from the digital pressure switch 20 to the tire/wheel assembly 85 so as to read the air/gas pressure inside the tire/wheel assembly 85. The other pneumatic line can extend from the digital pressure switch 20 or an electronic solenoid valve 30 to the tire/wheel assembly 85 so as to release excess air/gas pressure in the tire/wheel assembly 85 when the digital pressure switch 20 reads air/gas pressure in excess of a preset pressure. As a further example, the pneumatic line 32 can be a pressure switch line.

When air/gas pressure is in excess, the electronic solenoid valve 30 is electrically activated to an open position. In the open position, the electronic solenoid valve 30 bleeds off the excess pressure until the digital pressure switch 20 reaches the preset pressure. When the digital pressure switch 20 reaches the preset pressure, the electrical current to the electronic solenoid valve 30 is stopped, so that electronic solenoid valve 30 can be returned to its normally closed position. The digital pressure switch 20 and the electronic solenoid valve 30 cannot utilize the same pneumatic tube because when the electronic solenoid valve 30 is opened, it would give the digital pressure switch 20 a false pressure reading as it is bleeding off pressure.

As shown in FIG. 1, the pneumatic lines 22, 32 connect to pneumatic fittings. These pneumatic fittings can come in the form of an assembly. For example, the pneumatic fitting assembly can be a male quick disconnect 23 and a female quick disconnect 95. The pneumatic fitting assembly can be mounted directly into the tire/wheel assembly 85. Specifically in FIG. 1, the air pressure direction and the relation to the pneumatic fittings are represented by the arrows. For example, air pressure direction 98 demonstrates the pressure within the tire/wheel assembly 85. The connection between the pneumatic lines and the male quick disconnect 23 and the female quick disconnect 95 can be configured to allow for a quick disconnection.

Figure 2:
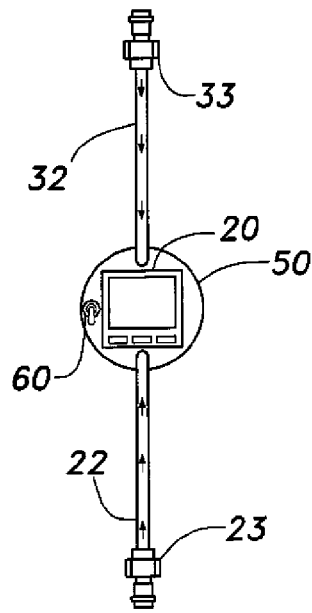
FIG. 2 is a front view of a tire pressure control system according to the present invention.
Figure 3:
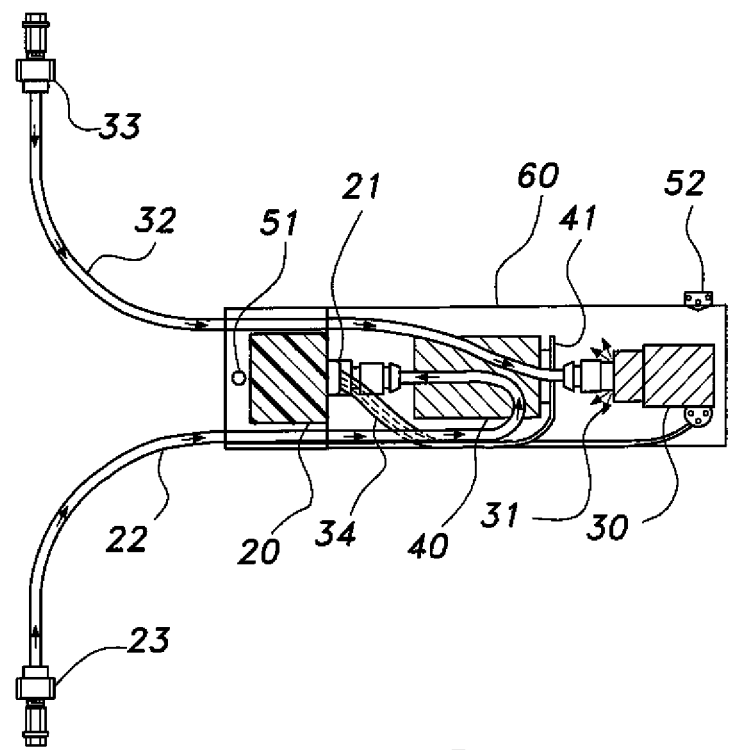
FIG. 3 is a cutaway view of a tire pressure control system according to the present invention.
Figure 4:
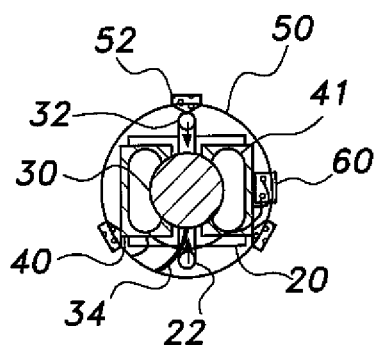
FIG. 4 is an end view of a tire pressure control system according to the present invention.
Figure 5:
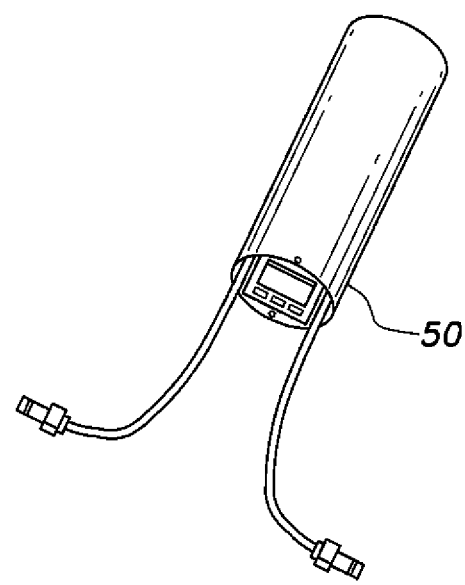
FIG. 5 is a perspective view of a tire pressure control system according to the present invention.

In FIGS. 1 and 3, a battery pack 40 is shown. The battery pack 40 is connected to the digital pressure switch 20 by an electrical connection 21. The electrical connection 21 can be any various common electrical connections, such as a connection via electrical wires 34. Included in the battery pack 40 is a battery terminal connector 41, which also powers the electronic solenoid valve 30 through the digital pressure switch 20. As shown in FIGS. 2 and 4, the battery pack 40 can be connected to an on/off switch 60 via wire connectors 34. The electronic solenoid 30 includes a pressure release area (31) to bleed off excess air when electrically charged.

The digital pressure switch 20, the electronic solenoid valve 30, and the battery pack 40 can be housed together all in the same housing, shown specifically in FIG. 3. The housing is adapted to be removably secured within the axle 75 so that the tire pressure control apparatus 50 can interact and communicate with the wheel assembly 85. As shown in FIG. 1, this housing can be positioned within the hollow region of the axle 75. The housing can be secured to the axle 75 by various securing mechanisms, for example by a mounting hole 51 toward the end of the housing. The mounting hole can be configured so that the housing and the tire pressure control apparatus 50 can be pinned to the axle 75. Additional securing mechanisms can include rubber plugs 52, as shown in FIG. 1. These rubber plugs 52 can allow for the housing and ultimately for the tire pressure control apparatus 50 to be snuggly fit within the axle 75.

It is to be understood that the present invention is not limited to the embodiments described above, but encompasses any and all embodiments within the scope of the following claims.

I claim:

1. In combination, a vehicle and a tire pressure control system for the vehicle, comprising:
    an axle;
    a tire mounted on a wheel, the wheel rotatably connected to the axle;
    a pair of pneumatic fittings in fluid communication with an interior of the tire;
    a selectively adjustable digital pressure switch;
    an electronic solenoid valve, the electronic solenoid valve in electrical communication with the selectively adjustable digital pressure switch by electrical connection so that the electronic solenoid valve is in fluid communication with the interior of the tire, wherein the electronic solenoid valve is selectively operated by the selectively adjustable digital pressure switch in corresponding relation to the interior of the tire to enable gas above a set pressure to pass to atmosphere;
    a pair of pneumatic lines, the pneumatic lines extending respectively from the selectively adjustable digital pressure switch and the electronic solenoid valve, the pair of pneumatic lines being removably connected to their respective pneumatic fittings such that the selectively adjustable digital pressure switch communicates with the tire;
    a battery assembly, the battery in communication with the selectively adjustable digital pressure switch to power the selectively adjustable digital pressure switch and the solenoid valve through the selectively adjustable digital pressure switch, wherein the battery assembly distributes electrical charges to activate the selectively adjustable digital pressure switch to selectively operate the electronic solenoid valve; and
    a housing, the housing being removably secured within the axle, wherein the selectively adjustable digital pressure switch, the electronic solenoid valve, and the battery assembly are housed within the housing.

2. The tire pressure control system according to claim 1, wherein each pneumatic fitting out of the pair of pneumatic fittings is an assembly that includes a male fitting and a female fitting.

3. The tire pressure control system according to claim 1, wherein the electrical connection includes electrical wires.

4. The tire pressure control system according to claim 1, wherein the battery assembly further comprises a battery terminal connector.

5. The tire pressure control system according to claim 1, wherein the battery assembly further comprises an on/off switch for selective operation.

6. The tire pressure control system according to claim 1, wherein the housing is removably secured within the axle by a mounting configured for pinning the housing to the axle.

7. A pressure control device adapted for mounting within an axle of a moving vehicle, the pressure control device consisting of:
    a pair of pneumatic fittings adapted to be in fluid communication with a fluid;
    a selectively adjustable digital pressure switch;
    an electronic solenoid valve, the electronic solenoid valve in electrical communication with the selectively adjustable digital pressure switch by electrical connection so that the electronic solenoid valve is in fluid communication with the interior of the tire, wherein the electronic solenoid valve is selectively operated by the selectively adjustable digital pressure switch in corresponding relation to the interior of the tire to enable gas above a set pressure to pass to atmosphere;
    a pair of pneumatic lines, the pneumatic lines extending respectively from the selectively adjustable digital pressure switch and the electronic solenoid valve, the pair of pneumatic lines being removably connected to their respective pneumatic fittings such that the selectively adjustable digital pressure switch communicates with the tire;
    a battery assembly, the battery in communication with the selectively adjustable digital pressure switch to power the selectively adjustable digital pressure switch and the solenoid valve through the selectively adjustable digital pressure switch, wherein the battery assembly distributes electrical charges to activate the selectively adjustable digital pressure switch to selectively operate the electronic solenoid valve; and
    a housing, wherein the selectively adjustable digital pressure switch, the electronic solenoid valve, and the battery assembly are housed within the housing.

8. The tire pressure control system according to claim 7, wherein the housing includes a mounting configured for pinning the housing within the axle.

* * * * *